March 17, 1959 M. E. PUIM 2,877,915
VEHICLE-MOUNTED LOADING APPARATUS
Filed April 5, 1957 2 Sheets-Sheet 1

INVENTOR.
M. E. Puim
ATTYS

March 17, 1959 M. E. PUIM 2,877,915
VEHICLE-MOUNTED LOADING APPARATUS
Filed April 5, 1957 2 Sheets-Sheet 2
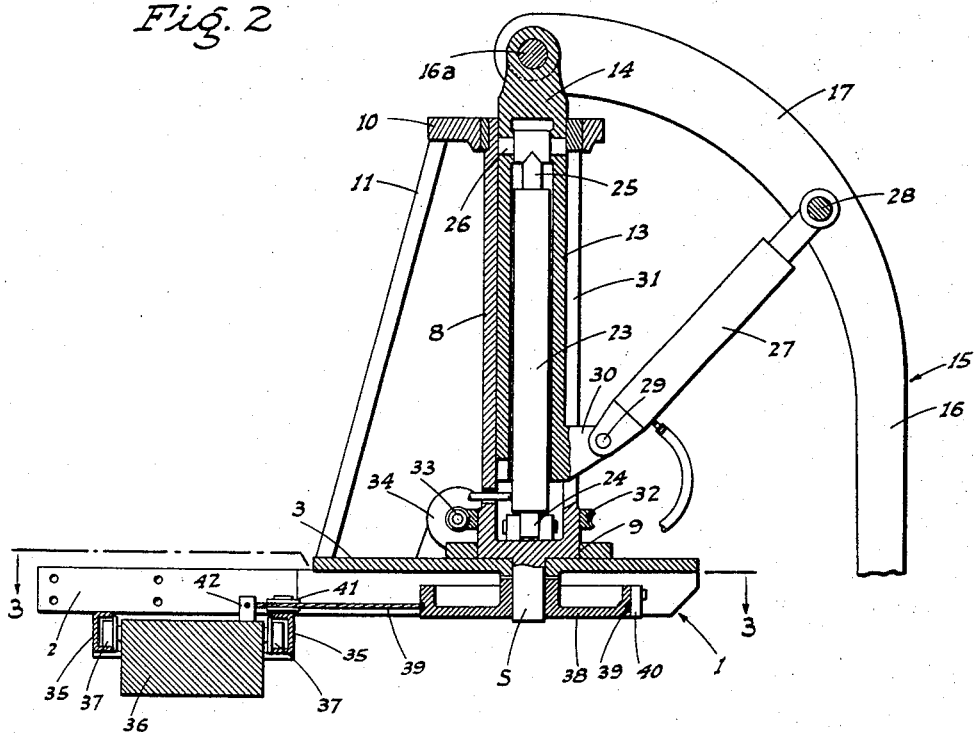
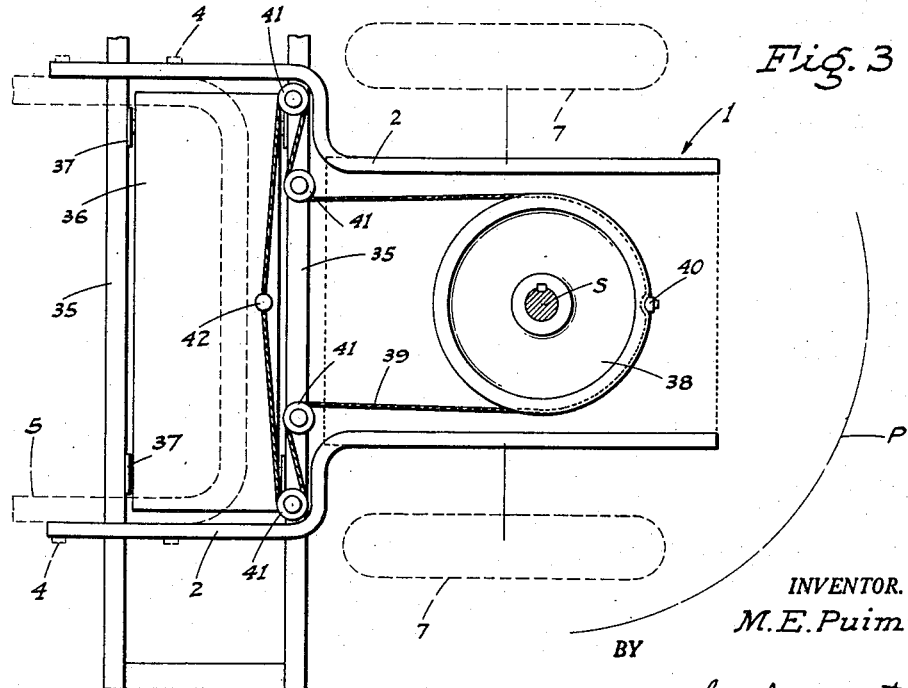
INVENTOR.
M. E. Puim

United States Patent Office 2,877,915
Patented Mar. 17, 1959

2,877,915
VEHICLE-MOUNTED LOADING APPARATUS
Manuel E. Puim, Los Angeles, Calif.
Application April 5, 1957, Serial No. 650,919
7 Claims. (Cl. 214—671)

This invention relates to load handling machines of what are commonly known as the bucket-loader or fork-lift types; one of the objects of the present invention being to provide a machine of this general character capable of being constructed, without change in design, so that either a dirt scooping and loading bucket, or a load lifting fork, may be mounted thereon.

A further object of the invention is to so mount the load engaging member that said member may be swung through an arc of approximately 180 degrees relative to the supporting vehicle on which the apparatus is mounted, either in the loading position of the member or when it is elevated.

In connection with this swinging feature, it is another object of the invention to provide a counterbalancing weight on the machine so connected to the load engaging member that said weight will be automatically shifted laterally to one side or the other of the machine in opposed relation to the direction of lateral swinging of said load engaging member.

A further object of the invention is to construct the apparatus as a whole so that it may be made as an attachment capable of being mounted on various makes of tractor, without necessarily including such tractor as an integral part of the apparatus.

It is also an object of the invention to provide a practical, reliable, and durable vehicle-mounted loading apparatus.

These objects are accomplished by means of such structure and relative arrangement of parts as will fully appear by a perusal of the following specification and claims.

In the drawings:

Fig. 2 is a fragmentary enlarged longitudinal section of the apparatus, detached.

Fig. 3 is a sectional plan, on line 3—3 of Fig. 2, showing particularly the weight mounting and control means.

Figure 1:
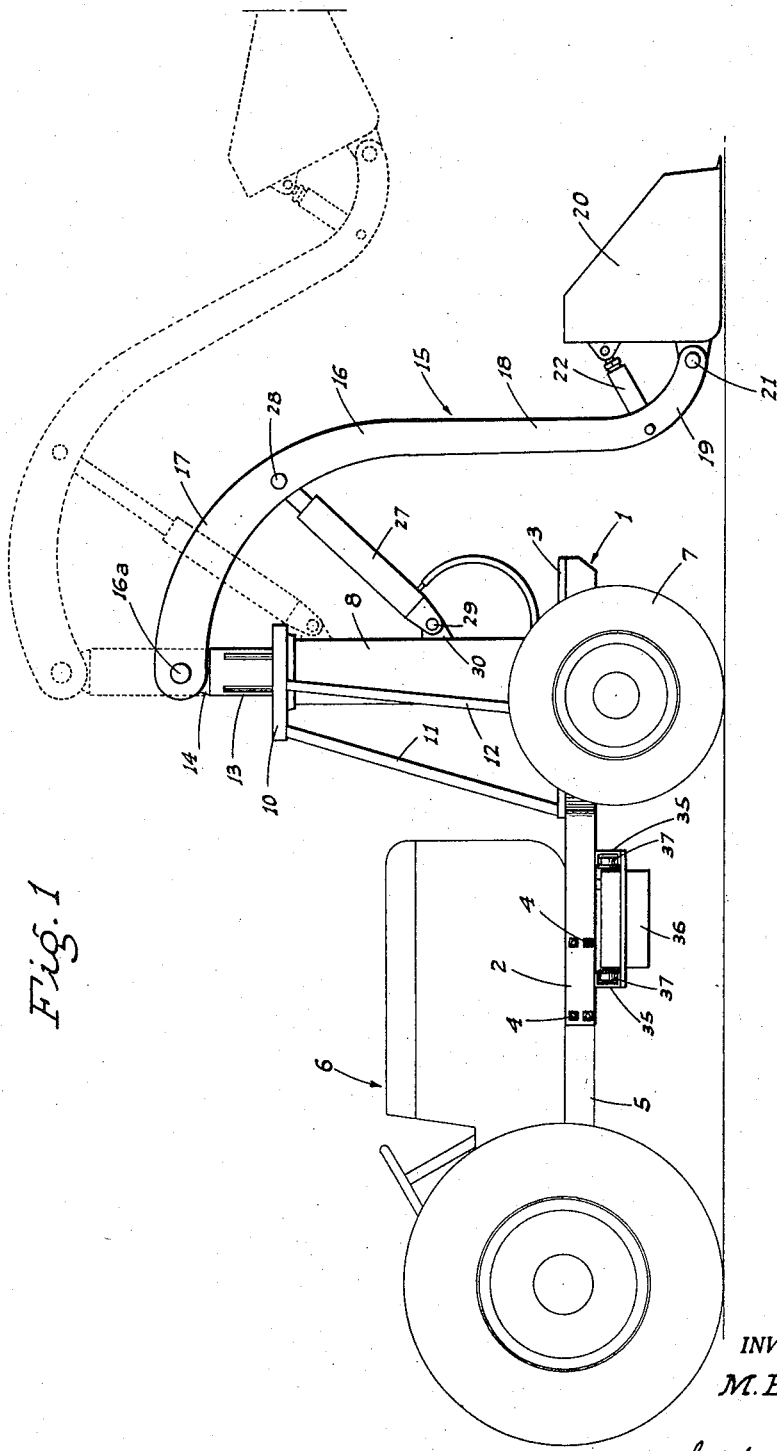
Fig. 1 is a side elevation of the improved apparatus as mounted on a supporting vehicle, and showing the load engaging member in a straight-ahead position.

Referring now more particularly to the drawings, and to the characters of reference marked thereon, the apparatus comprises a main frame, indicated generally at 1, and which includes side beams 2; the forward portions of which support—and are connected by—a platform 3. The beams 2 at their rear end are adapted to straddle and be secured to—by bolts 4 or the like—the side frame beams 5 of a tractor 6.

In the specific arrangement shown in Fig. 1, the front wheels of the tractor have been removed from their normal position and shifted ahead or replaced by other front wheels 7 arranged to support frame 1 ahead of the tractor. This is to provide a ground support for the frame 1 at a point as close as possible to the load engaging area of the apparatus, and so as to avoid a possible downward tipping of the tractor when a heavy load is being lifted. These wheels 7 and the manner of mounting and controlling the same, however, form no part of the present invention.

Upstanding from the platform 3 centrally of the width thereof is a telescopic unit which includes a tubular column 8. This column is turnably mounted at its lower end on the paltform in a bearing element 9, and at its upper end in a bearing plate 10 which is supported from the rear portion of the platform by diverging legs, two of which are indicated at 11 and 12.

The telescopic unit also includes a hollow post 13 which is slidably and non-turnably mounted in the column and is formed with a head 14 on its upper end which projects above the column and plate 10. Depending from the head 14 is a boom 15 which comprises a pair of transversely spaced arms 16 pivotally mounted on said head by a transverse pivot 16a. The arms 16 are shaped so that their upper end portions 17 curve outwardly and downwardly away from the column 8; their intermediate portions are normally substantially vertical, as at 18; while their lower end portions curve forwardly and away from the column, as at 19.

The arms are arranged so that said portions 18 thereof—when vertically disposed—are spaced radially from the column 8 so that upon rotation thereof, together with the post, the depending arm portions 18 will move through an arcuate path P (see Fig. 3) which will clear the wheels 7. The boom may thus be swung 90 degrees each way from a straight-ahead position without wheel interference.

At their lower ends the arms support a load engaging and lifting member. In the present instance such member is in the form of a scraping and loading bucket 20 of conventional form, which at the back and adjacent the bottom is connected to the boom arms by a transverse pivot 21. The bucket is additionally connected to the boom by an extensible two-way hydraulic ram 22 extending between the bucket and boom above the pivot 21, as shown in Fig. 1, and by means of which the angular relation of the bucket to the boom may be altered as operating conditions may require.

It will of course be obvious that a fork-lift unit, of conventional form, may be connected to the boom in place of the bucket shown.

The post 13 is raised and lowered in the column 8, so as to correspondingly raise and lower the bucket, by means of a hydraulic cylinder 23 mounted within the post 13 and supported at its lower end in the column at the base thereof, as at 24. A piston rod 25 upstanding from the cylinder is connected to the post immediately below the head 14, as at 26, so that the maximum amount of lift may be obtained.

The boom is connected intermediate its ends to the post 13 at the lower end thereof by means of a diagonally extending hydraulic ram 27. This ram is pivoted at its upper end on and between the upper portions 17 of the boom arms, as at 28, and at its lower end, as at 29, on an ear 30 projecting radially from the post and working in a vertical guide slot 31 in the column 8. By means of this ram the boom may be swung away from the column to any desired extent within the range of extension of said ram, so as to elevate the bucket from the ground in addition to the elevation gained by upward movement of the post, as shown in dotted lines in Fig. 1.

Rotation of the column—and parts turnable as a unit therewith—is controlled by means of a worm gear 32 secured on the column adjacent its lower end. This gear is engaged by a worm 33 driven by a fluid or other form of motor 34 mounted on the platform 3.

As the column is rotated to one side or the other from a normal straight-ahead position, the overhanging weight of the boom and the load carried thereby is counterbalanced by the following means:

Fixed with and below the frame beams 2 rearwardly of wheels 7, or in other words toward the rear end of said beams, is a pair of longitudinally spaced transverse rails 35.

A weight block 36 is positioned between the rails, being supported from said rails for guided movement transversely of the machine by side rollers 37 on the weight engaging the rails, which are preferably channels disposed in facing relation to each other.

Depending from, and rigid with, the column 8 axially thereof is a spindle S projecting below the platform and carrying a sheave 38 on its lower end. A cable 39 extends about the normally forward portion of the sheave, being secured at its then foremost point against slippage by any suitable means, such as is indicated at 40.

The cable extends rearwardly from each side of the sheave, to and about direction-changing pulleys 41 mounted on the foremost rail 35 laterally inward of the frame beams 2, and then laterally to an anchor 42 on the weight centrally of its ends and adjacent its forward edge.

By reason of this arrangement, as the sheave 38 (and the boom 15) turns to one side, the run of the cable 39 which projects rearwardly from the opposite side of the sheave causes the weight to be pulled along the rails toward said opposite side; thus counterbalancing the weight of the boom as it is swung laterally.

The sheave 38 is made as large as possible so as to give a maximum amount of cable movement for each 90 degrees rotation of the sheave, and the direction-changing pulleys are arranged so as to enable a corresponding amount of movement to be imparted to the weight.

From the foregoing description it will be readily seen that I have produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A load handling apparatus comprising a horizontal vehicle-mounted frame, a telescopic unit upstanding from the frame, means turnably mounting the unit on the frame, means controlling the rotation of the unit relative to the frame, a boom mounted on and depending from the unit clear of the frame, and a load handling member mounted on the lower end of the boom; the telescopic unit comprising a tubular column supported on the frame and a hollow post, open at its lower end, slidably and non-turnably mounted in the column, the boom being connected to the upper end of the post, and a hydraulic ram within the column and post and connected at its opposite ends thereto.

2. A load handling apparatus comprising a horizontal vehicle-mounted frame, a telescopic unit upstanding from the frame, means turnably mounting the unit on the frame, means controlling the rotation of the unit relative to the frame, a boom mounted on and depending from the unit clear of the frame and normally in a position in front of the unit and centrally of the width of the frame, a boom counterbalancing weight, means mounting the weight on the frame behind the unit for movement transversely of the frame in opposite directions from a normal central position, and means controlled by rotation of the unit to slide the weight laterally in a direction to counterbalance the boom.

3. A load handling apparatus comprising a horizontal vehicle-mounted frame, a telescopic unit upstanding from the frame, means turnably mounting the unit on the frame, means controlling the rotation of the unit relative to the frame, a boom mounted on and depending from the unit clear of the frame and normally in a position in front of the unit and centrally of the width of the frame, a boom counterbalancing weight, a pair of longitudinally spaced transverse rails mounted on and under the frame behind the unit and between which the weight is disposed, means on the weight supporting the same from the rails for movement along the same, a sheave fixed with the telescopic unit below the same and in a horizontal plane above the weight, a cable extending about the sheave from in front and secured thereto at a point in radial alinement with the boom, an anchor element on the weight centrally between its ends, the cable extending rearwardly from opposite sides of the sheave in the form of opposed runs connected at their rear ends to the anchor, and direction-changing pulleys mounted in a fixed position and about which said cable runs pass between the sheave and the anchor; said pulleys being positioned so that rotation of the sheave and boom in one direction laterally of the frame will cause the cable to pull the weight transversely in the opposite direction.

4. A load handling apparatus comprising a horizontal vehicle-mounted frame, a telescopic unit upstanding from the frame, means turnably mounting the unit on the frame, means controlling the rotation of the unit relative to the frame, said unit comprising a tubular column and a post slidably and non-turnably mounted in and projecting above the column, means between the column and post controlling the up and down movement of the post, a boom pivotally mounted on the post at its upper end and depending thence clear of the frame, a load handling member mounted on the lower end of the boom, an ear projecting radially from the post adjacent its lower end and in substantially radial alinement with the boom, the column having a vertical slot through which the ear projects, and a hydraulic ram extending between and connected to the ear and to the boom intermediate its ends.

5. Apparatus, as in claim 4, in which the means turnably mounting the unit on the frame comprises supporting and bearing means for the lower end of the column, a bearing member engaging the column at its upper end, and supporting legs depending from said member to the frame and arranged so as to avoid interference with the hydraulic ram upon rotation of the unit through an arc of 90 degrees to either side of a central position.

6. A load handling apparatus comprising a horizontal vehicle-mounted frame, a boom supporting unit upstanding from the frame, means turnably mounting the unit on the frame, means controlling the rotation of the unit relative to the frame, a load supporting boom pivotally mounted on the upper end of the unit and arranged for rotation therewith, and an extensible ram extending diagonally between the unit and the boom intermediate its ends and turnable with said unit; the unit including a vertical column and the means turnably mounting the unit on the frame comprising supporting and bearing means for the lower end of the column, a bearing member engaging the column at its upper end, and supporting legs depending from said member to the frame and arranged so as to avoid interference with the ram upon rotation of the unit through an arc of 90 degrees to either side of a central position.

7. A load handling attachment for a tractor having side beams, the attachment comprising a load engaging and elevating apparatus, and a mounting frame for the apparatus comprising side beams extending longitudinally of the tractor; said apparatus including a boom arranged to project beyond one end of the frame beams, and a support for the boom upstanding from the adjacent portions of the frame beams, the portions of said frame beams opposite said one end thereof being spaced apart to straddle the side beams of the tractor from one end thereof in lapping and substantial engagement therewith; there being means securing the corresponding lapping portions of the tractor beams and frame beams together.

References Cited in the file of this patent

UNITED STATES PATENTS

| | | |
|---|---|---|
| 1,497,686 | Johnson | June 17, 1924 |
| 1,788,097 | Frisbie | Jan. 6, 1931 |
| 2,413,096 | Barker | Dec. 24, 1946 |
| 2,675,927 | Le Tourneau | Apr. 20, 1954 |
| 2,774,483 | Raymond | Dec. 18, 1956 |
| 2,790,568 | Mandt | Apr. 30, 1957 |
| 2,835,396 | Pilch | May 20, 1958 |